United States Patent [19]

Simmons

[11] Patent Number: 4,619,017
[45] Date of Patent: Oct. 28, 1986

[54] POULTRY PROCESSING APPARATUS

[76] Inventor: Lacy W. Simmons, 101 Simmons Industrial Blvd., Dallas, Ga. 30132

[21] Appl. No.: 761,424

[22] Filed: Aug. 1, 1985

Related U.S. Application Data

[60] Division of Ser. No. 517,811, Jul. 27, 1983, Pat. No. 4,550,473, Continuation-in-part of Ser. No. 873,370, Jan. 30, 1978, abandoned.

[51] Int. Cl.$^4$ ............................................. A22C 21/00
[52] U.S. Cl. .......................................... 17/11; 17/12
[58] Field of Search ...................................... 17/11, 12

[56] References Cited

U.S. PATENT DOCUMENTS

| | | | |
|---|---|---|---|
| 3,417,424 | 12/1968 | Chamberlain | 17/11 |
| 3,750,231 | 8/1973 | Schreuder | 17/11 |
| 3,886,635 | 6/1975 | Meyn | 17/11 |
| 4,035,867 | 7/1977 | Meyn | 17/11 |
| 4,183,118 | 1/1980 | Graham et al. | 17/11 X |

Primary Examiner—Willie G. Abercrombie
Attorney, Agent, or Firm—Eric P. Schellin

[57] ABSTRACT

An apparatus for use in performing operations on birds moving along an overhead line in a poultry processing operation. The apparatus comprises a plurality of individual modules, each module including a V-shaped aligning and holding guide for aligning and holding the neck of a bird against displacement which cooperates with a projecting breaking assembly to break the neck of the bird embraced by the guide. The V-shaped guide is pivotally mounted to a support frame, so that it can be pivoted from an open position to a closed position, where it engages the neck of the bird.

5 Claims, 16 Drawing Figures

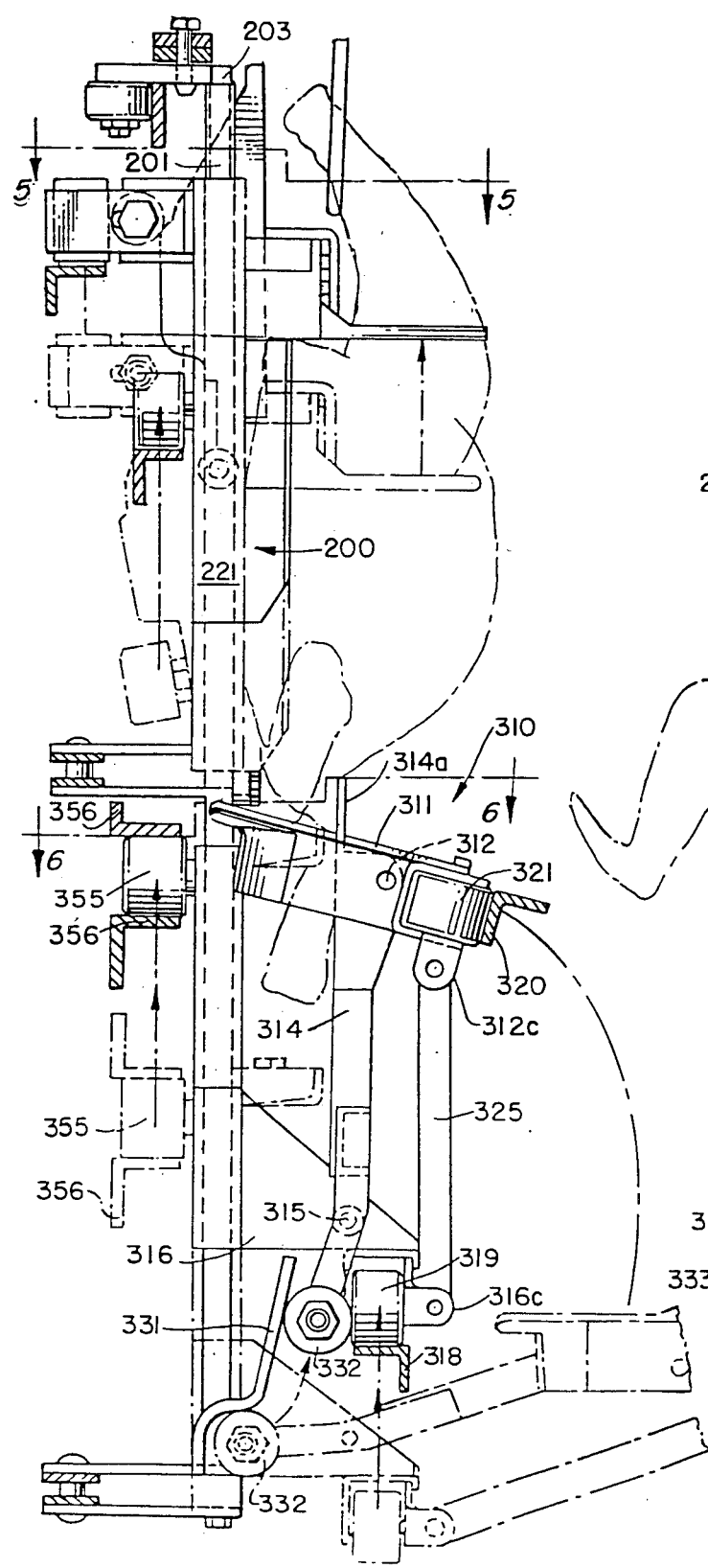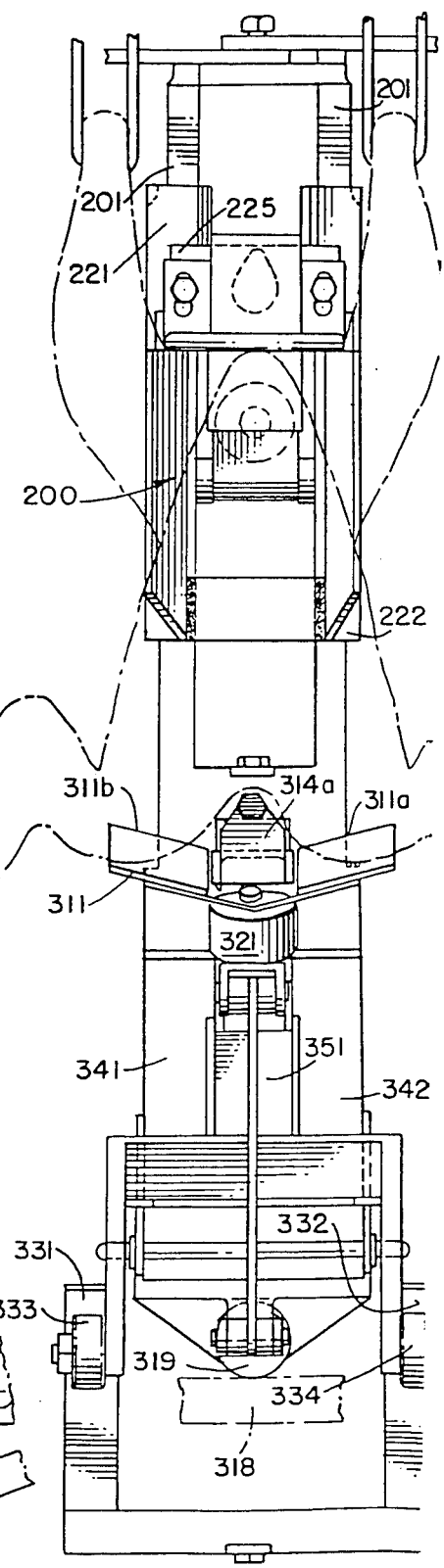

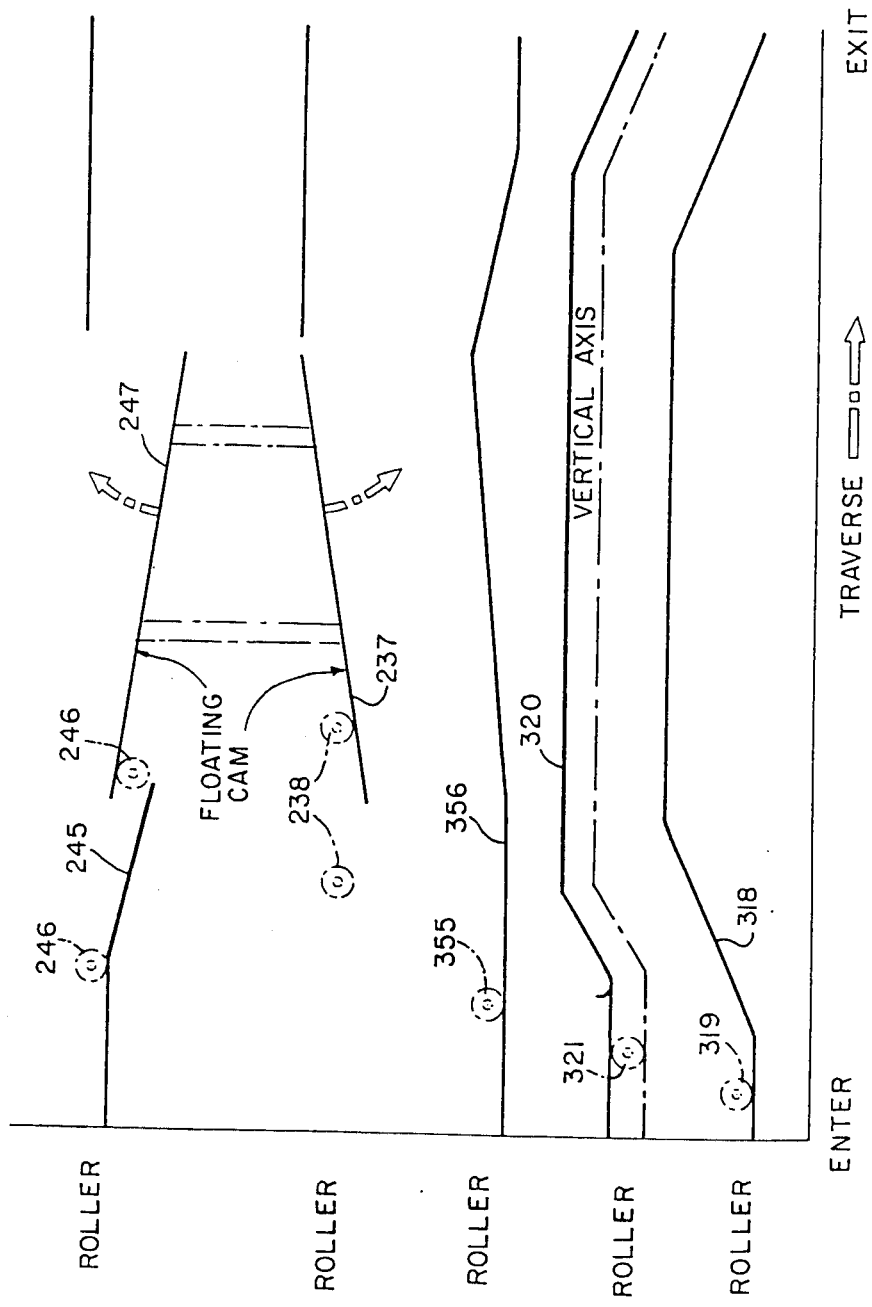

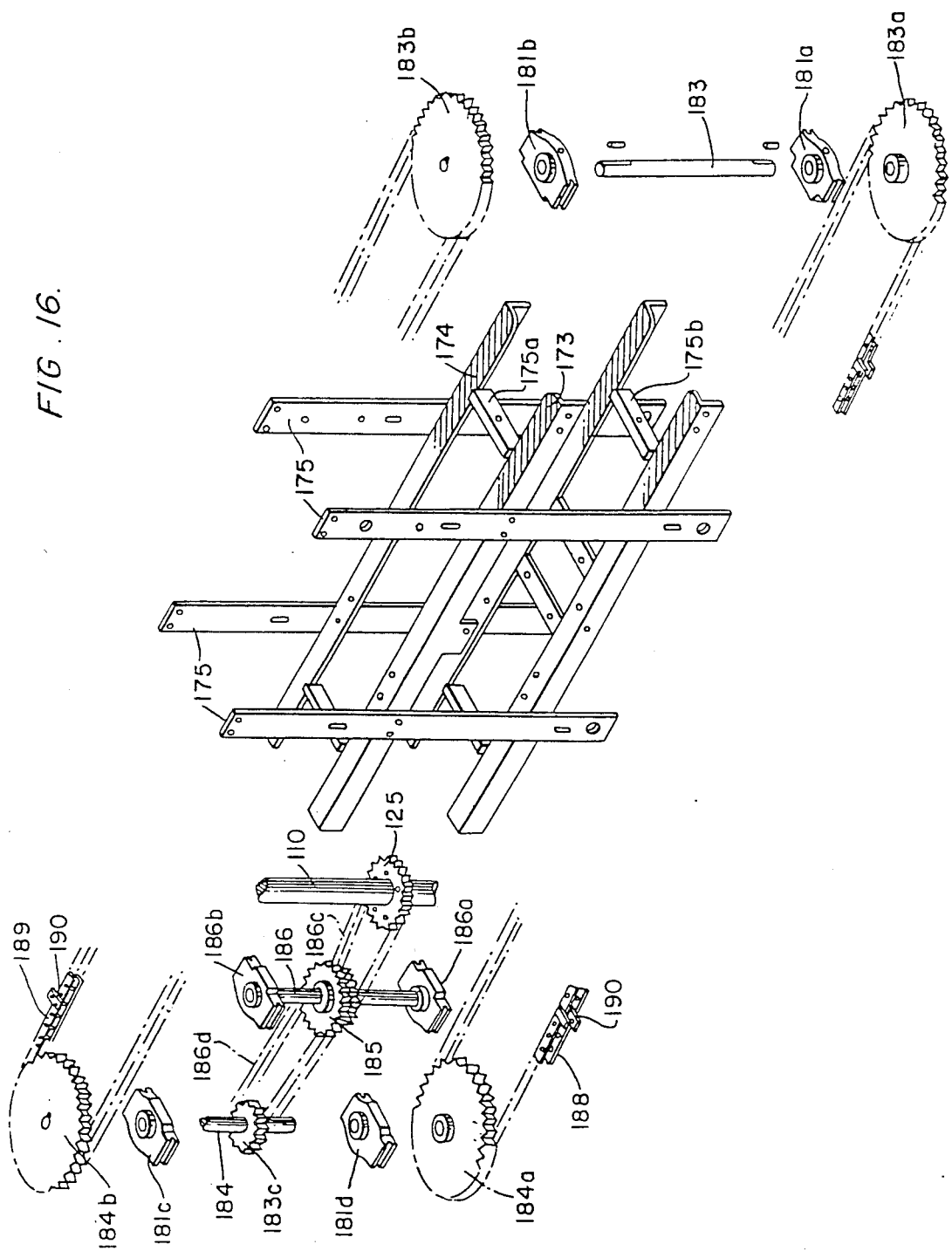

POULTRY PROCESSING APPARATUS

This is a division of application Ser. No. 517,811 filed July 27, 1983, now U.S. Pat. No. 4,550,473, which is a continuation-in-part application of Ser. No. 873,370, filed Jan. 30, 1978, now abandoned.

BACKGROUND OF THE INVENTION

This invention relates to poultry processing apparatus and is more particularly concerned with an oil sac removing operation, a neck breaking operation and their support frame and drive means.

The present poultry processing lines require a number of operators station adjacent the line for individually holding and manually removing the oil sac. This process is costly to the processing operation and its performance is subject to the many characteristics affecting worker habits and conditions.

A number of attempts have been made to design apparatus which could perform the oil sac removing operation. However, the prior art apparatus have been undesirable in that the apparatus was ineffective, leaving a high percentage of the oil sac, causing back-up operators to be available for finishing the job.

Also, a number of attempts have been made to provide apparatus for breaking the neck of birds moving along the processing line. The prior art neck breakers required individual equipment, are complex in construction and use and fail to do an effective job thus, they are not economically advantageous to the processing operation.

Further, most of the prior art poultry processing apparatus require complex frame structures and complex drive mechanism that require a complete shut down of the processing line for extended periods of time which adds considerably to the cost of installation, maintainence and repair of the equipment. In addition the prior art frame structure are large requiring excessive space along the processing line which would often require a complete line location or building addition in order to accomodate the apparatus.

SUMMARY OF THE INVENTION

The above indicated disadvantages have been overcome by the present invention which basically includes a simple frame support and drive mechanism which can be installed adjacent a processing line with a minimum of effort and down time and can be selectively adjusted relative to the processing line, after installed, for movement between a line engaged driving position and a disengaged inoperable position whereby repair can be performed without stopping the line.

Another feature of the present invention is to provide guide means operatively associated with the bird supporting shackles which are automatically adjusted between operable processing positions and displaced inoperable positions.

A further feature of the present invention is to provide a frame support post and concentrically mounted drive assembly which are adjustable vertically relative to each other and a processing line.

A still further feature of the present invention is to provide frame support and drive assembly which require a minimum of space.

Another feature of the present invention is to provide an effective oil sac removing mechanism.

Yet another feature of the present invention is to provide an effective neck breaking mechanism.

An additional object of the present invention is to provide poultry processing apparatus which is simple in construction and use, economical to manufacture and reliable in performance.

Additional objects and advantages of the details of construction will become apparent after reading the following description of the illustrative embodiments with reference to the attached drawings.

BRIEF DESCRIPTION OF THE DRAWINGS

FIG. 2 is a side view of the module;

FIG. 3 is a front view of the module;

FIG. 15 is a diagrammatic chart of the camming motions described when the invention is operated;

FIG. 16 is a perspective of the frame portion designed to carry the drive means.

DETAILED DESCRIPTION OF THE INVENTION

Figure 1:
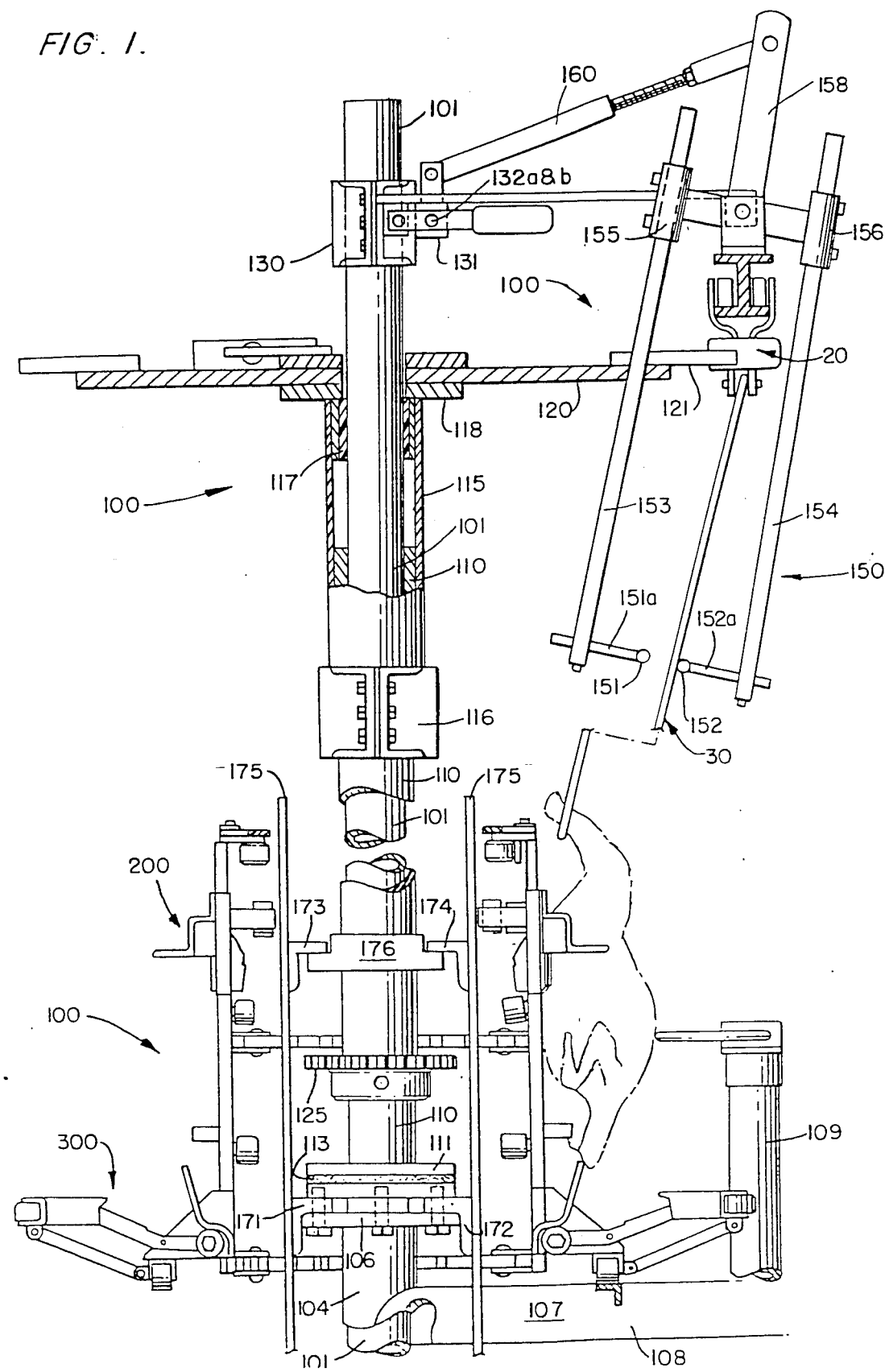
FIG. 1 is a fragmentary side view of the invention, partially in cross-section showing side views of modules of the invention.

Referring to the drawings, the processing apparatus embodying the principles of the present invention is generally represented by reference numeral 10 and will be described with reference to the frame support and drive mechanism assembly 100 and the processing modules including oil sac removing apparatus 200 and neck breaking apparatus 300.

Figure 10:
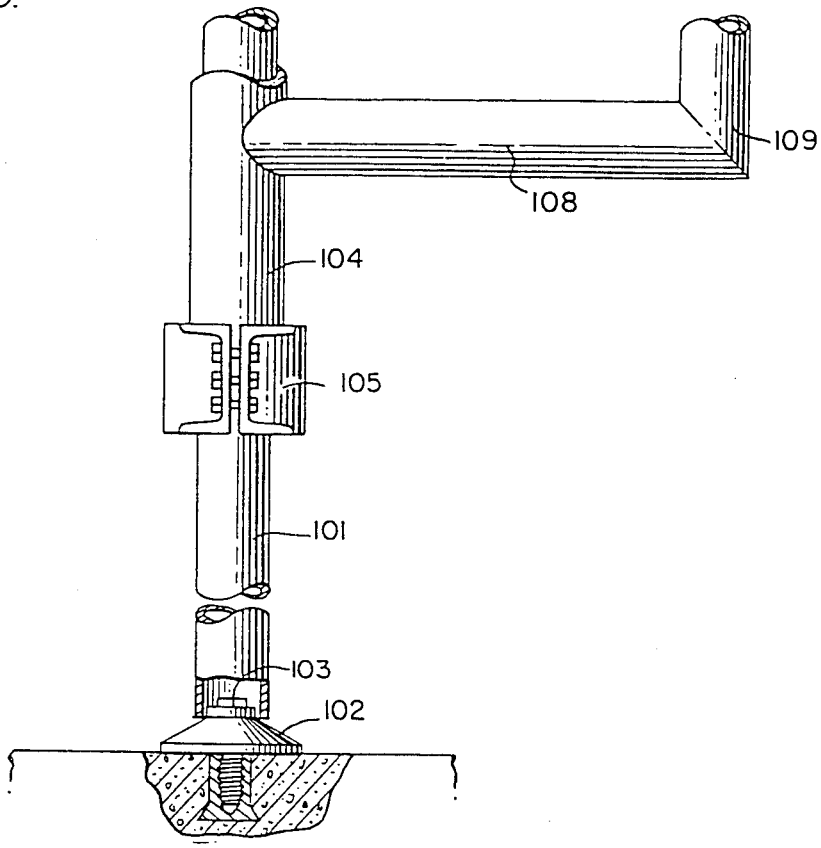
FIG. 10 is a side view partially in cross-section of the lowermost portion of the support means for the invention.

The frame support portion of the assembly 100 includes a single post or pipe element 101 which extends from a base support element 102 (see FIG. 10) up through the processing mechanism and to a position above a drive mechanism whereby the post 101 is connected by over-center linkage adjustment means to a processing line support beam. The base support element 102 is fixed to the floor by conventional anchor screw means 103 and the base support 102 is shaped on the top to provide a pivot surface for the post 101 which partially embraces the base support as shown in FIG. 10. Additionally as shown in FIG. 10, the frame assembly includes a second pipe element 104 which is slidably supported on post 101. A lower end of pipe element 104 is provided with a clamp means 105 designed to clamp onto post 101 and retain pipe element 104 at a selected axially disposed elevation.

The upper end of pipe element 104 is provided with a bearing plate 106. A support arm 107 is fixed to pipe 104 and includes a horizontal portion 108 and a vertical portion 109. The purpose of support arm 107 will be described in more detail herein below. A third pipe element 110 is journaled on pipe 101 above pipe 104. The lower end of pipe 110 includes a bearing plate 111. Fitted between bearing plates 106, 111 and around post 101 is a bearing member 113. A fourth pipe element 115 is journaled around pipe 101 and slidably received over pipe 110. Pipe 115 is slidably and axially adjustable relative to pipe 110 and is secured in an adjusted set position by a clamp assembly 116.

As shown in FIG. 1, the upper end of pipe 115 is provided with bearing sleeve 117 which is fitted between pipe 101 and pipe 115 and spaced above the end of pipe 110. A plate 118 is fixed to the upper end of pipe 115 and provides an adjustable support for drive wheel 120, with wheel 120 being fixed. Drive wheel 120 includes a plurality of radially extending lugs 121 which are adapted to engage shackle support assemblies 20 carried by the poultry processing line in such a manner so that movement of the processing line will effect rotary movement of drive wheel 120, pipes 115, 110 and a drive sprocket 125 secured to pipe 110 a short distance above bearing plate 111. Drive sprocket 125 is utilized to provide drive through a chain and sprocket drive assembly to the processing apparatus, as will be described in more detail below.

Figure 11:
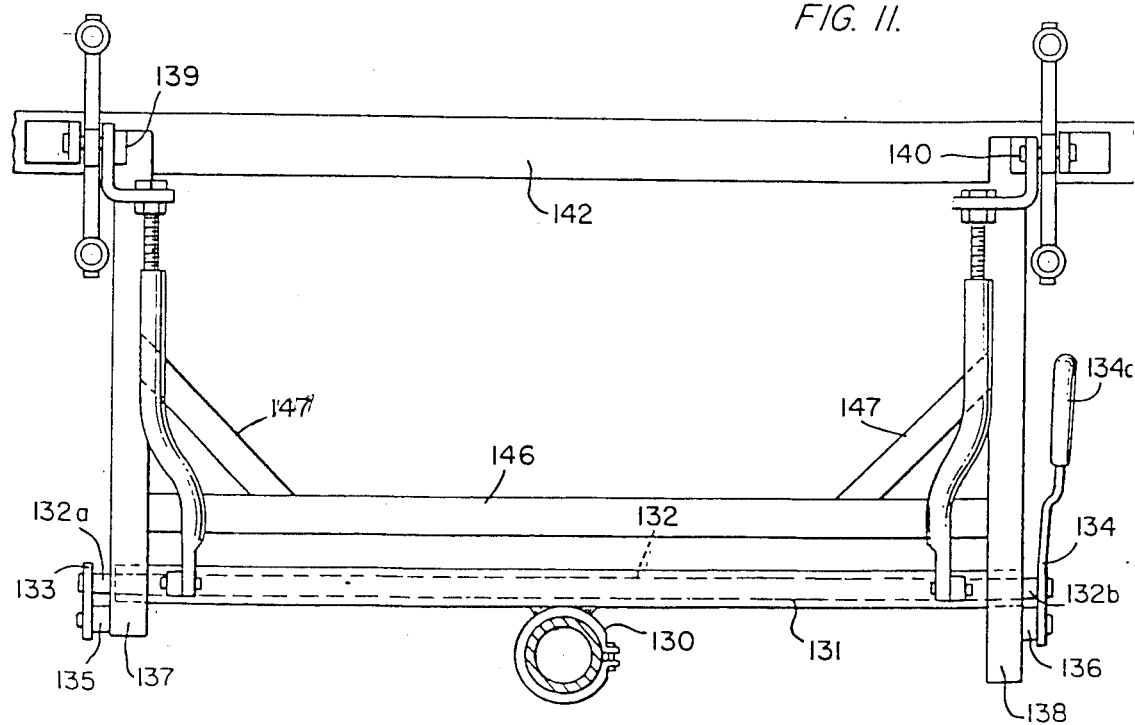
FIG. 11 is a top view of the invention showing only the means for moving the invention into engagement with the conveyer means carrying a plurality of chickens.
Figure 12:
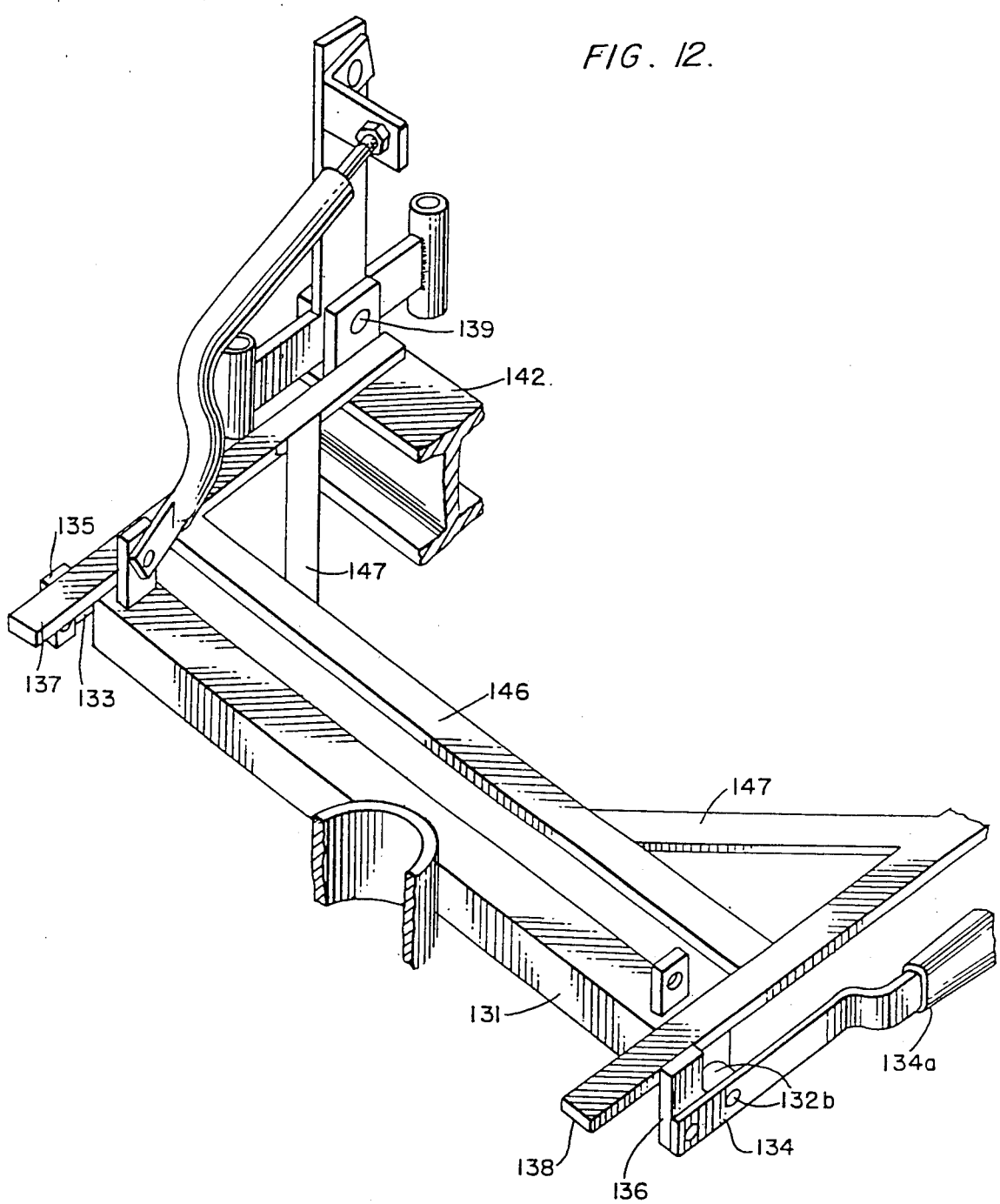
FIG. 12 is a fragmentary perspective of the engaging means of FIG. 11.
Figure 13:
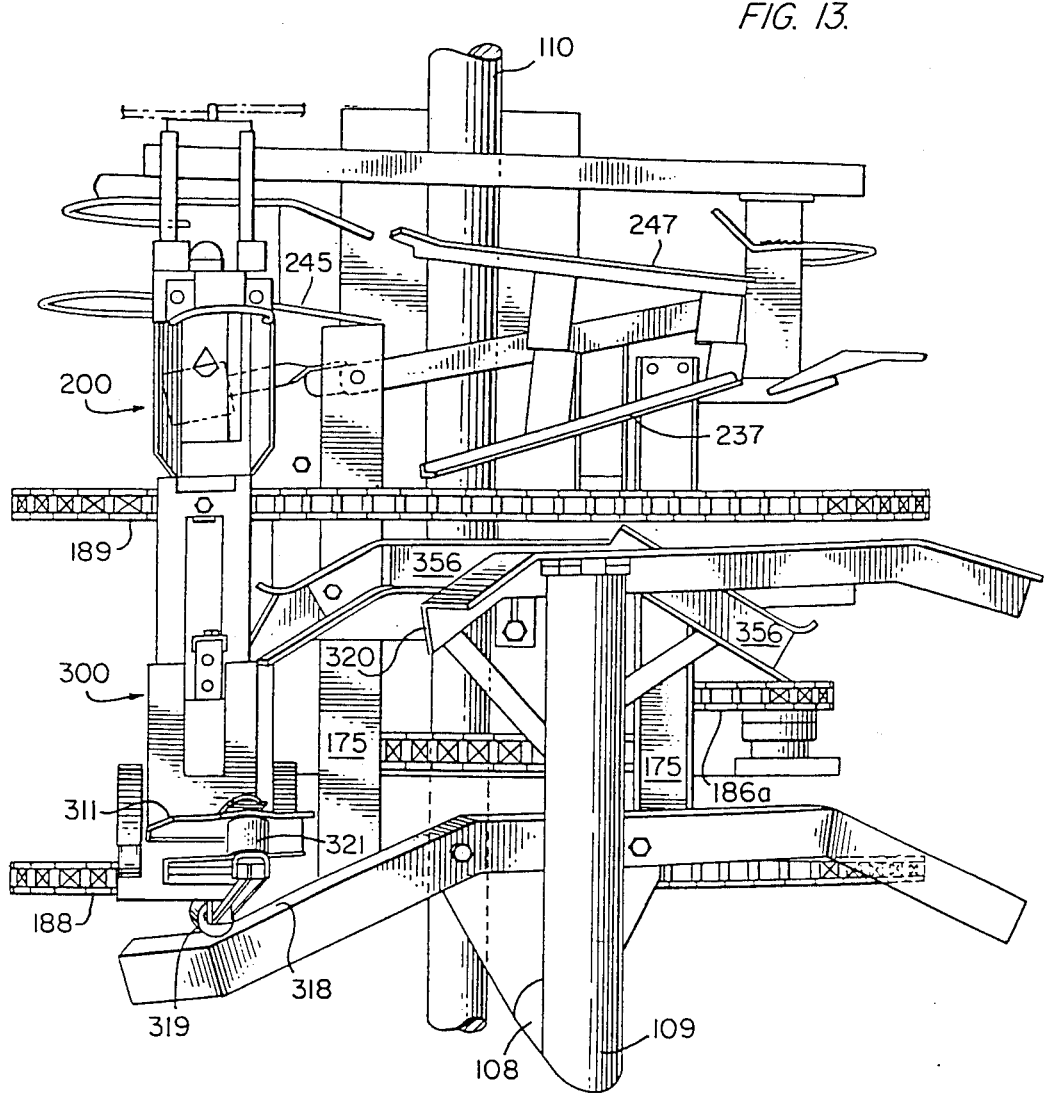
FIG. 13 is a fragmentary front view of the invention depicting a front view of a module illustrating the various cam surfaces operatable on suitably disposed contact rollers on the module.
Figure 14:
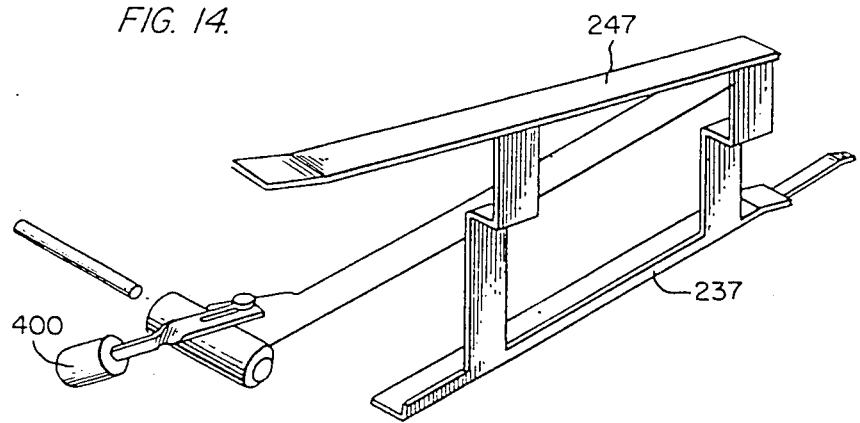
FIG. 14 is a perspective of the floating cam surface means also shown in FIG. 13.

The over-center linkage adjustment mechanism is utilized to adjust the frame support and drive mechanism relative to the processing line includes a clamp assembly 130 secured to pipe 101 above drive wheel 120 (FIG. 1, 11 and 12). An elongated support housing 131 is fixed in a horizontal relationship to clamping assembly 130 and is aligned parallel to the processing line. A pivot shaft 132 is journaled within housing 131 and includes extended end portions 132a, b which provide a rotary support for control links 133, 134. One end of link 133 is pivotally connected to pivot block 135 which is fixed to a bar element 137. One end of link 134 is pivotally connected to a pivot block 136 which is fixed to a bar element 138. Link 134 includes an extended handle portion 134a which is utilized to effect swinging movement of links 133, 134 from one over-center adjusted position to a second over-center adjusted position. As shown in FIGS. 11 and 12, the opposite ends of bar elements 137, 138 are pivotally supported of fixed pivot means 139, 140 which are secured to an upper surface of a processing line support "I" beam 142. Since the pivot means 139, 140 are secured in a set position, swinging movement of control handle 134a will cause the housing element 131 to move toward and away from the processing line and since housing element 131 is secured to support post 101, post 101 and its supported mechanism will be adjusted relative to the processing line. The drive wheel lugs 121 will be effectively adjusted to a line engaging driving position (FIG. 11) when control linkages 133, 134 are moved to one adjusted position and the drive wheel will be moved to a displaced disengaged position in response to movement of control link to a second adjusted position. The bar elements 137, 138 are detailed in location for contacting the upper surface of housing 131 to provide a limit step means for control links 133, 134. Reinforcing bar elements 146, 147 are operatively connected between bar elements 137, 138 to provide stability to the adjustment control means.

As shown in the drawings, especially FIG. 1, processing apparatus 10 include guide means 150 operable for engaging and guiding shackles into position adjacent processing modules during a processing operation and guiding the shackles along a path displaced from the processing modules when the processing apparatus 10 is not in use. Guide means 150 include a pair of guide bars 151, 152 supported adjacent opposite sides of poultry supporting shackles 30 (FIG. 1). Guide bars 151, 152 include a pair of spaced support rods 151a, 152a, respectively, which are adjustably secured adjacent the lower ends of support standards 153, 154. Standards 153, 154 are vertically adjustable in collar means 155, 156 and are secured to a predetermined position by conventional set screw means. Collars 155, 156 are secured to outwardly extending ends of an inverted "T" shaped rocker arms 158. Rocker arm 158 is pivotally supported on the aforementioned pivot means 139, 140, respectively, which are fixed to the upper surface of support beam 142. Adjustable rod means 160 is connected between an upper extended end of rocker arm 158 and the frame housing 131 whereby movement of the frame housing toward and away from the processing line in response to actuation of control linkages 133, 134 will produce a pivotal adjustment of the rocker arms 158. Adjustment of rocker arms 158 will effect displacement of the guide bars 151, 152 between the operable processing position and the inoperable position. The horizontal position, vertical elevation and angular relationship of the guide bar can be adjusted by a number of set screw adjustment means and by the adjustment rods. The over-center linkage will effect the adjustment of the guide bars between the adjusted positions and will hold them in their adjusted positions.

When the guide bars 151, 152 are supported in the operable position shown in FIG. 1, the shackles supporting the birds will be advanced along a path adjacent the modules processing mechanism 200, 300.

As shown in the drawings, the processing apparatus includes a vertical spaced pair of horizontally arranged angle frame elements 171, 172 and 173, 174. Frame elements 171, 172 are connected to plate element 106 secured to the upper end to plate element 106 secured to the upper end of pipe 104. Angle frame elements 173, 174 are supported above frame elements 171, 172 by a number of vertically oriented plates 175a and 175b, for instance, fixed thereto by conventional connecting means, such as welding (not shown). A bearing assembly 176 is fitted around pipe 110 and is connected to upper frame elements 173, 174 to provide additional stability to the frame assembly. The angle frame elements provide means for adjustably supporting vertically aligned conventional bearing assemblies 181a, 181b and 181c, 181d. Bearing assemblies 181a, 181b are used to support drive shaft 183. A double idler sprocket 185 is supported by shaft 186 which is journaled by bearing means 186a, 186b mounted on angle frame elements 171-174. One portion of idler sprocket 185 is connected by chain 186c to sprocket 125 fixed to the drive pipe 110. A second portion of sprocket 185 is connected by chain 186d to a sprocket 183c fixed to drive shaft 184.

As shown in FIG. 16, the upper and lower ends of shafts 183, 184 are provided with sprockets 183a, b and 184a, b, respectively. Sprockets 183a, 184a are supported on the same plane and provide support and drive for endless chain 188. Sprockets 183b, 184b are coplanar and support chain 189. Chains 188, 189 support a plurality of modules with each including oil sac removing apparatus 200 and neck breaking apparatus 300. The number of modules are sufficient to present and engage successive shackles moving along the processing line with successive modules whereby a continuous processing operation can be performed on all birds moving along the processing line.

The drive mechanism including the above described sprocket and chain assembly and the drive input delivered by drive wheel 120 when supported in operative engagement with the processing line is designed to advance the modules in timed relationship with the processing line. The drive can be selectively started and stopped by adjustment of the over-center control linkage 134 described above.

As shown in the drawings the processing modules are constructed to include a pair of channel shaped frame elements 201, 202 oriented so that the channels face each other and define guide track means for permitting sliding movement of processing components supported thereon. Frame elements 201, 202 are supported in spaced relationship by a number of transverse connecting bars 203, 204, 205. The modules are supported on endless chains 188, 189 by connecting pin means 190 to bar elements 204, 205 respectively. The pin means is selectively removable to permit the modules to be added to or taken from the support chains when repair or general maintenance is required.

Figure 7:
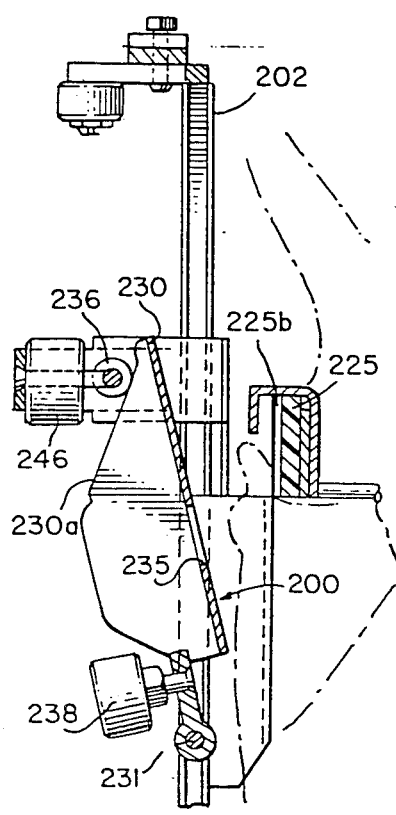
FIGS. 7, 8 and 9 are in sequence and are fragmentary cross-sectional views of the module showing the removal of the oil sac from an operated upon chicken.
Figure 8:
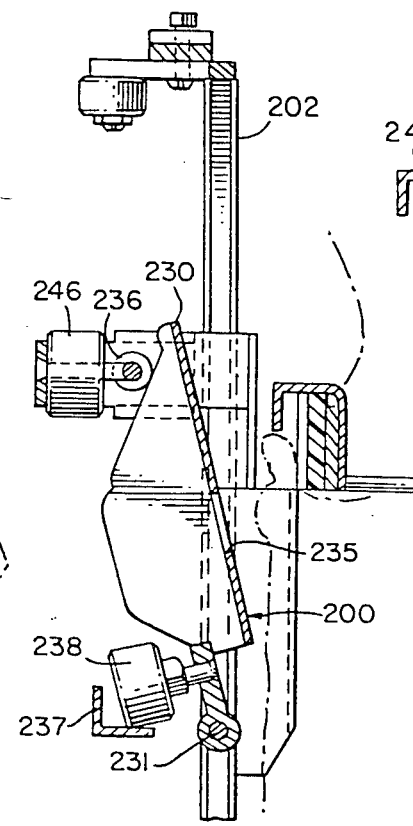
Figure 9:
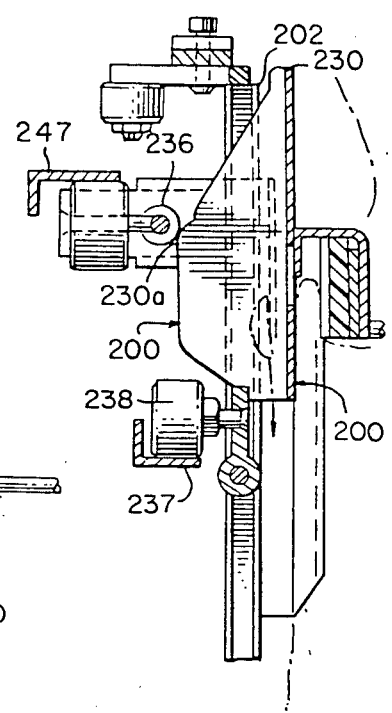

The oil sac removing apparatus 200 is supported on the upper portion of the channel shaped frame elements 201, 202 for operable sliding movement between bar elements 203, 204. The oil sac removing apparatus includes a pair of channel shaped frame members 221, 222 which are fitted around the outer surface of frame elements 201, 202 respectively. Conventional bearing means 207, 208 are fitted between frame elements 201, 221 and 202, 222 to permit free sliding movement between the limits of bars 203, 204. Frame elements 221, 222 are fixed in spaced relationships by transverse frame portions 223, 224. Transverse frame portion 223 includes an outwardly projecting curved portion 223a operable for engaging and aligning poultry supporting shackles present adjacent thereto in a processing operation. Also supported on frame portion 223 in a shaped poultry tail confining and holding block 225. Block 225 includes inwardly directed sloping surfaces 225a, 225b flowing to a tail bone alignment channel 225c. The tail alignment and confinement block is designed for engaging and holding tail portion of a poultry, as shown in the drawings, during an oil sac removing operation. The poultry's oil sac is removed by a movable pressure plate 230 and slidably supported within the channels of frame elements 221, 222. Pressure plate 230 is pivotally supported adjacent the lower end by a transverse shaft and roller assembly 231. Transverse shaft and roller assembly 231 is freely slidable within the channels of frame elements 201, 202. The upper end of pressure plate 230 extends upwardly through the space defined by the alignment block 225 and between frame elements 201, 202. Plate 230 is designed to develop pressure on the poultry's tail section around the oil sac and includes an orifice 235 designed to receive a protruding oil sac. Pressure plate 230 is normally supported in an open position as shown in FIG. 7 with upper end of plate 230 being supported against roller stop means 236. When a bird's tail is positioned within the tail confining area defined by block 225; cam track means 237 will contact roller 238 in response to movement of the processing module relative to the frame support means and since roller 238 is mounted on pressure plate 230, elevational slope in cam track 237 will cause roller 238 to first pivot pressure plate 230 about the axis of roller 231 to move the pressure plate to a closed position. When pressure plate 230 is moved to a closed position, see FIG. 8, the pressure plate 230 will apply pressure on the tail section around the oil sac to cause the oil sac to protrude outwardly through the pressure plate orifice 235. Pressure applied by plate 230 is applied first in a direction generally away from the bird's tail and along a path forming an acute angle with a line drawn generally paralleld to the bird's back. The edges of the protruding oil sac are engaged by the peripheral edges of pressure plate orifice 235. A continued elevational movement of roller 238 by cam track 237 will cause the pressure plate to be advanced upwardly relative to the bird's oil sac and the orifice edges will effectively remove the oil sac from the bird's back during a continued upward advancement of pressure plate 230. Pressure is maintained in the bird's tail section around the orifice by the angular location of roller 238 and also by roller 236 engaging cam surfaces 230a formed on pressure plate 230.

Figure 4:
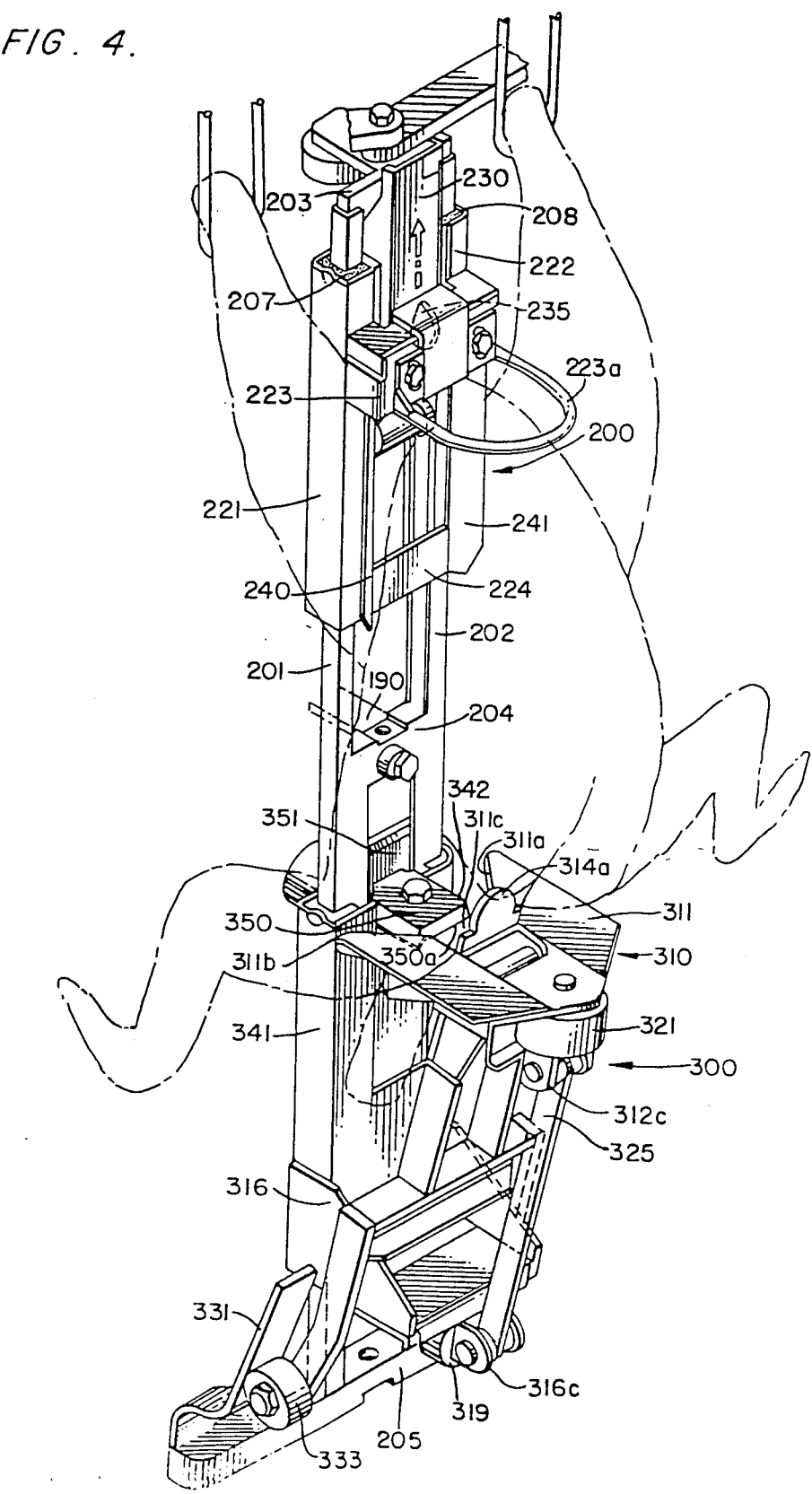
FIG. 4 is a perspective of the module.
Figure 5:
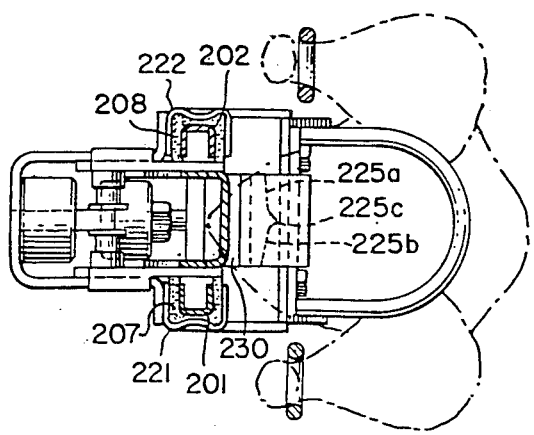
FIG. 5 is a cross-section taken along line 5—5 of FIG. 2.
Figure 6:
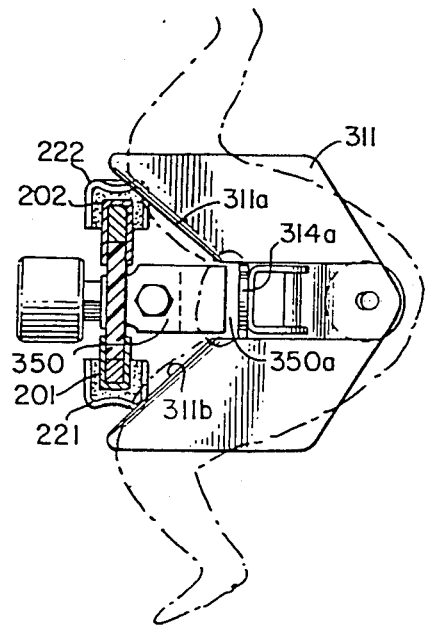
FIG. 6 is a cross-section taken along line 6—6 of FIG. 2.

As shown in the drawings, the oil sac removing apparatus include a number of guide and alignment elements. One alignment is shown in FIG. 4 and includes angularly disposed plate elements 240, 241 which extend divergently outwardly from frame elements 221, 222 and in a direction toward a supported bird. The alignment plates 240, 241 will contact the back of the bird and effectively center the bird relative to the oil sac removing apparatus.

The oil sac removing assembly 200 is normally supported in an elevated position above birds moving along the processing line by a cam track 247 and a cam track roller 246 mounted on the oil sac removing assembly. The oil sac removing apparatus is lowered onto the bird by a downward sloping of cam track 245 and in timed relationship with movement of the module into engagement with a bird moving along the processing line. Alignment block 225 will contact the rump of an aligned bird adjacent a bird's tail to provide effective means for identifying the location of the bird's tail section and oil sac. After the bird's oil sac has been effectively removed as described above, the cam track control means 237, 247 are designed to disengage the oil sac removing apparatus from the processed bird, with the module chain support and drive means being operable to return the processing module to a position up the processing line for operative engagement with another bird to perform an oil sac removing operation.

The module neck breaking apparatus 300 is shown in FIGS. 2, 3 and 4 and includes a bird neck aligning and holding assembly 310. Alignment assembly 310 includes a plate member 311 having outwardly diverging alignment surfaces 311a, 311b which are designed to engage, guide and horizontally align and hold the bird's neck in a neck breaking chamber 311c. Alignment plate 311 is pivotally supported by pin means 312 adjacent the upper end of a support arm 314. Support arm 314 is pivotally supported at 315 on a support bracket 316. An upper extended end of support arm 314 include a shaped surface 314a detailed to engage the breast bone of a bird to assist in alignment of the bird. The alignment plate 314 and alignment surface 314a are adjustable between pivoted open bird disengaged position and a closed bird engaged position by the pivotal movement of support arm 314. Arm 314 and plate 311 are controlled for movement between the opened and closed positions by a cam track 320 mounted on vertical portion 109 supported for operative engagement with a roller 321 supported on the back of plate 311. Plate 311 is maintained in a horizontal relationship by a control link 325 connected between bracket 312c and a bracket 316c. Arm 314 and link 325 define a parallelogram system for controlling angular movement of alignment plate 311. Additional angular adjustment of the parallelogram linkage is effected for operative engagement with a pair of rollers 333, 334 supported on the lower ends of extended portions of arm 314. The neck breaking alignment mechanism 312, 314 etc. are supported for vertical sliding movement along the module frame elements 201, 202 by a pair of complimentary channel shaped elements 341, 342 supported on channels 201, 202, respectively. Bracket 316 is fixed to channels 341, 342. The support channels 341, 342 and their supported alignment mechanism is controlled for vertical adjustment relative to the supporting module by a cam track 318 and roller 319 mounted beneath the base of bracket 316.

As shown in FIGS. 2, 3 and 4, the neck breaking mechanism includes a neck severing or breaking block 350. Block 350 is mounted on a plate 351 slidably supported by channels 201, 202. Block 350 is detailed in shape to fit within the neck breaking chamber 311c formed in plate 311. The neck breaking block is controlled during vertical adjustment by a roller 355 supported in operative engagement with a cam track 356. Block 350 includes an extended severing edge 350a.

In a neck breaking operation, the alignment plate 311 is controlled by cams 318, 320, 331 and 332 to position plate 311 in contact with and underneath the bird's shoulders with the neck guided into the breaking chamber 311c. The neck breaking block 350 is lowered into and held in position with the block horizontally aligned in the neck breaking chamber 311c, by cam track control means 356. After the breaking block 350 is positioned, cam track 320 cams plate 311 forward until the reaction of the severing edge 350a against the front surface of arm 314 to effect a severing of the neck of the bird, all but a small portion of skin which will allow the neck to be carried by the bird further down the processing line. After the neck has been severed to the degree described in the above, the cam track means 356 is designed to move block 350 downwards thereby, while plate 311 is being held in the closed position to thereby stretch the neck skin downward for a predetermined distance to allow for additional processing of the bird's neck further down the processing line.

What is claimed is:

1. Apparatus for breaking the neck of a bird in a poultry processing operation, comprising:
   (a) means for engaging the bird in such a manner so as to identify the locations of the bird's neck;
   (b) V-shaped means for aligning and holding the bird's neck against displacement;
   (c) means for engaging and breaking the neck of said bird; and
   (d) means for supporting said engaging means, said aligning and holding means, and said breaking means on module support means which is advanced in timed relationship with said bird as said bird is advanced in a head lowermost position along a predetermined path in a processing line during a processing operation, the V-shaped aligning and holding means is pivotally coupled to the module support means so that it can pivot between a first open position and a second closed position in which the neck of the bird is properly aligned and held during the pivoting closing motion, and cooperates with the breaking means during the closing motion to break the neck of the bird.

2. Apparatus as defined in claim 1 further characterized in that said aligning and holding means includes means for engaging and holding the shoulders of said bird against downward displacement and wherein said neck breaking means is operable for stretching the neck skin downward after a neck breaking operation has been effected.

3. Apparatus as defined in claim 2 further characterized in that said apparatus includes cam track means and cam follower means for effecting operation of said engaging means, said aligning and holding means, said neck breaking means and said neck stretching means in response to timed advancement of said supporting module.

4. Apparatus as defined in claim 3 further characterized in that said apparatus includes means for returning said module to a position up the poultry processing line for operative engagement with another bird to perform an additional oil sac removing operation.

5. Apparatus as defined in claim 4 further characterized in that said apparatus includes a plurality of modules supported on endless support means, with each module including said neck engaging, aligning, holding and breaking means and wherein said number of modules is detailed to present a module into engagement with successive birds moving along said processing line.

* * * * *